Patented Nov. 8, 1932

1,886,682

UNITED STATES PATENT OFFICE

HORACE S. HUBBARD, OF PITTSFIELD, MASSACHUSETTS, ASSIGNOR TO GENERAL ELECTRIC COMPANY, A CORPORATION OF NEW YORK

CABLE TESTING EQUIPMENT

Application filed March 24, 1932. Serial No. 600,913.

My invention relates to cable testing equipment and more particularly to such equipment including electric valves for supplying high voltage unidirectional current suitable for testing high voltage cable.

In the testing of high voltage cable it is desirable to have an apparatus which will (1) supply a sufficiently high voltage to pick out a weak spot in the insulation or create a fault therein; (2) carbonize a path through the fault or reduce its resistance to a relatively low value, and (3) send out an interrupted direct current through the fault so that its location may be determined by any suitable fault detection apparatus, for example, an exploring coil and associated phones or indicating instruments.

Heretofore there have been devised certain arrangements including electric valves, suitable for supplying extremely high voltage unidirectional current for testing high voltage cable equipment. The arrangements of the prior art have generally utilized two electrode high vacuum pure electron discharge valves because of their suitability for operation at extremely high voltages. Such arrangements are particularly suitable for producing a fault at a weak spot in the insulation of a cable under test. An example of such equipment is described and claimed in my Patent No. 1,867,407 July 12, 1932, and assigned to the same assignee as the present application. After the production of a fault, as described above, it is desirable to increase the current through the fault sufficiently to carbonize the fault, that is, to decrease its resistance, and thereafter to supply intermittent unidirectional current through the fault which may be detected by any suitable fault detecting means, such for example, as an exploring coil together with ear phones or instruments, etc. While apparatus embodying my invention and having the latter characteristics is most useful as a complement to testing equipment of the type disclosed in the aforementioned application, in certain instances it may be capable also of initially producing a fault in the cable, that is, completely testing the cable.

It is an object of my invention therefore to provide an improved cable testing equipment which will supply sufficient high voltage unidirectional current to carbonize a fault in a cable and which will thereafter supply intermittent unidirectional current to provide for the detection of the fault.

It is another object of my invention to provide an improved cable testing equipment which will initially supply to the cable sufficient current to carbonize a fault in the cable and will thereafter supply intermittent unidirectional current impulses and which includes means for deenergizing the testing equipment in response to abnormal fault current.

In accordance with my invention a cable to be tested is connected to be energized from an alternating curent circuit through rectifying means including a vapor electric discharge valve, preferably provided with a control grid for regulating the amount of current transmitted therethrough. The grid of the electric valve is connected to be energized from the alternating current circuit through a motor driven reversing switch, the effect of which is to render the valve conductive when the grid potential is of the same polarity as the anode potential, and to render the valve non-conductive when these two potentials are of opposite polarity. There is also provided disconnecting means for the rectifier which operates in response to abnormal fault current to momentarily deenergize the rectifying means.

For a better understanding of my invention, together with other and further objects thereof, reference is had to the following description taken in connection with the accompanying drawing and its scope will be pointed out in the appended claims. The single figure of the accompanying drawing illustrates an arangement embodying my invention for supplying high voltage unidirectional testing current to a cable from a source of alternating current.

Referring now to the drawing, there is illustrated an arrangement for supplying high voltage unidirectional current to a cable 10 from a source of alternating current 11. The cable 10 is illustrated as comprising a mittent unidirectional impulses to the cable.

2. In an equipment for testing a cable comprising a plurality of insulated conductive elements, the combination of a source of alternating current, a high voltage transformer, a pair of grid controlled vapor electric valves comprising with said transformer a controlled rectifier, connections from the direct current circuit of said rectifier for exciting the conductive elements of said cable, a circuit for connecting the grids of said valves to said alternating current circuit, and means for periodically reversing the connections of said grid circuit for supplying intermittent unidirectional impulses to said cable.

3. In an equipment for testing a cable comprising a plurality of insulated conductive elements, the combination of a source of alternating current, rectifying means for interconnecting said source and the conductive elements of said cable including a vapor electric valve provided with a control grid, means for energizing said grid from said source, means for periodically reversing the polarity of the grid potential for supplying intermittent unidirectional impulses to said cable, and means responsive to abnormal fault current for momentarily deenergizing said rectifying means.

In witness whereof, I have hereunto set my hand.

HORACE S. HUBBARD.

Nov. 8, 1932.                H. C. HUEGLIN                1,886,683
                            VENTILATING MEANS
                       Original Filed June 30, 1928
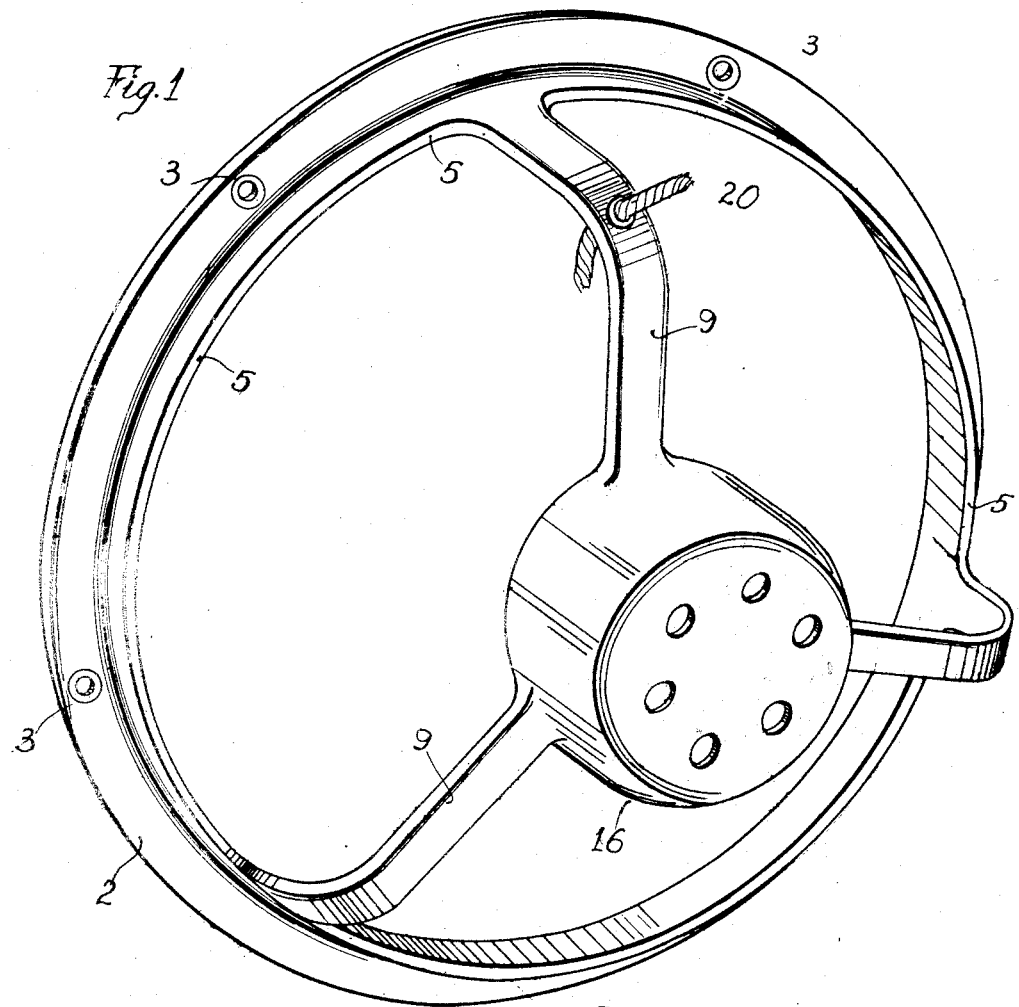
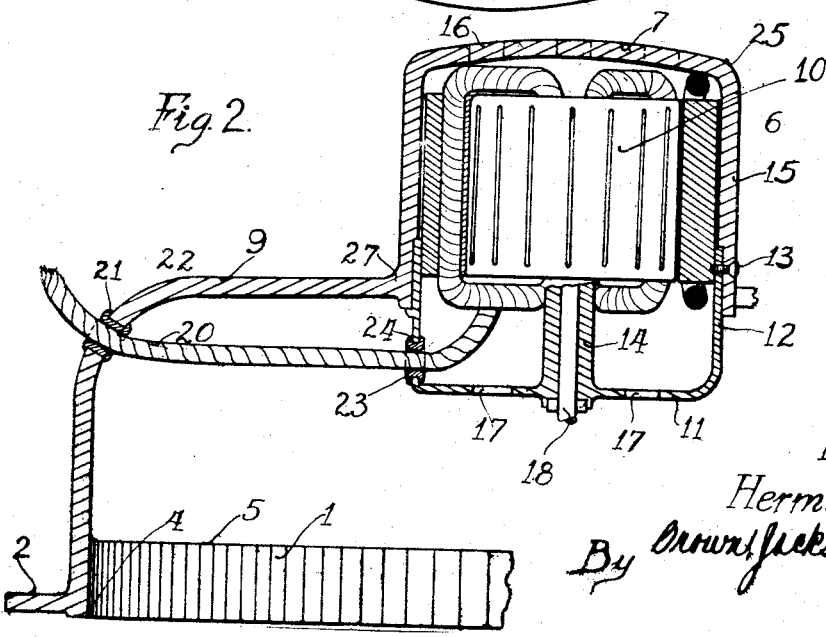
Inventor
Herman C. Hueglin